(12) United States Patent
Winkler

(10) Patent No.: US 6,220,647 B1
(45) Date of Patent: Apr. 24, 2001

(54) RETRACTABLE AWNING FOR A GOLF CART

(76) Inventor: David R. Winkler, 4503 Fox Creek Ct., Pacific, MO (US) 63069

( * ) Notice: Subject to any disclaimer, the term of this patent is extended or adjusted under 35 U.S.C. 154(b) by 0 days.

(21) Appl. No.: 09/634,437

(22) Filed: Aug. 8, 2000

(51) Int. Cl.$^7$ ........................................................... B60J 7/08
(52) U.S. Cl. .............. 296/100.14; 296/111; 280/DIG. 5; 135/88.01
(58) Field of Search .................................... 296/111, 77.1, 296/100.14, 107.02, 97.21, 107.09, 78.1, 136, 118; 280/DIG. 5, DIG. 6; 135/88.01, 88.02, 88.09; 150/159

(56) References Cited

U.S. PATENT DOCUMENTS

| | | |
|---|---|---|
| 208,564 | 10/1878 | Bowers . |
| 1,470,630 * | 10/1923 | Mahr ................................ 296/107.02 |
| 2,689,579 | 9/1954 | Sartori . |
| 4,469,114 | 9/1984 | Kelley et al. . |
| 4,641,879 * | 2/1987 | Kasai ................................ 296/111 X |
| 4,830,037 | 5/1989 | Held . |
| 4,846,524 | 7/1989 | Gerber . |
| 5,010,941 | 4/1991 | Ross, Sr. et al. . |
| 5,058,943 * | 10/1991 | Louderback .................... 296/107.09 |
| 5,069,481 | 12/1991 | Strange . |
| 5,072,987 * | 12/1991 | Allen ................................ 296/111 X |
| 5,184,865 * | 2/1993 | Mohtasham et al. ............. 296/111 X |
| 5,551,745 * | 9/1996 | Huang ................................ 296/111 |
| 5,588,690 | 12/1996 | Showalter . |
| 5,688,018 | 11/1997 | Simpson . |
| 5,741,041 | 4/1998 | Sullivan . |
| 6,007,134 | 12/1999 | Weston . |
| 6,068,325 | 5/2000 | Hughes . |

* cited by examiner

Primary Examiner—Joseph D. Pape
(74) Attorney, Agent, or Firm—Greensfelder, Hemker & Gale, P.C.

(57) ABSTRACT

A retractable awning for attachment to a golf cart is provided. The awning is comprised of a framework having a plurality of U-shaped rib members and a fabric cover. The U-shaped rib members have ends terminating at a common pivot point to allow respective relative movement to move the awning between an extended deployed position and a retracted closed position over a rear compartment of the golf cart. Each successively adjacent rib member is dimensioned slightly less than its preceding rib member to allow nesting of all the rib members in a common plane so that the framework can lie substantially flat in its retracted position. Sleeve members for receiving the rib members are provided on the underneath side of the awning cover to allow the fabric to deploy and retract over the framework without binding.

11 Claims, 7 Drawing Sheets

RETRACTABLE AWNING FOR A GOLF CART

BACKGROUND OF THE INVENTION

This invention relates to coverings and awnings for golf carts. A standard golf cart has an area for stowage of golf clubs and other equipment at the rear of the cart. While the cart's roof covers persons riding in the cart, it leaves the equipment in the stowage area uncovered. Golfing equipment can be very expensive, and it is undesirable for it to get wet because of rain. As such, a cover extending over the rear stowage area of the cart is desirable. However, ready access by a golfer to his equipment is essential, so the cover should not obstruct the golfer's ability to reach for clubs as needed. Further, if rainy conditions are not present, the cover is not needed and must be moved out of the way. There exist retractable covers that extend over the cart's stowage area, but they often do so in a cumbersome fashion. While some covers, when deployed, may do an adequate job in keeping rain off the equipment, they do not fold away in a neat, compact fashion when retracted after use.

SUMMARY OF THE INVENTION

By means of the instant invention there is provided a retractable awning for the rear equipment stowage area of a golf cart. The awning is comprised of a framework having a fabric covering extended over a plurality of U-shaped rib members joined at their ends at a common pivot point. The rib members are moveable relative to each other so that the awning can be moved in fan-like fashion between an open, deployed position to a closed, retracted position. A first top rib member forms the top, forward lateral edge of the awning, and each successive rib member supports a portion of the fabric to give structural shape to the awning in its deployed state. The awning is attached to the rear of a golf cart by fastening the top rib member to the underneath side of the rear edge of the roof of the golf cart. The respective pivot points of the rib members are supported against the cart's vertical support posts. Each successive rib member has an incrementally smaller dimension than its preceding rib member such that all the rib members can be nested together in a common plane when the awning is in the closed retracted position. Sleeves are disposed on the inner surface of the fabric to receive the rib members which allows the fabric to deploy smoothly over the framework. A fabric flap is provided at the top lateral edge to enable the loose awning fabric to be gathered neatly together when the awning is held against the rear edge of the cart's roof in the closed retracted state.

It is therefore an object of the present invention to provide a retractable awning for attachment to the rear of a golf cart to protect equipment stored in the cart's stowage area. Another object of the invention is to provide a retractable awning having a framework comprised of rib members that nest together in planar alignment when in a closed retracted position. These and other object of the present invention are realized in the preferred embodiment of the present invention, described by way of example and not by way of limitation.

Additional object, advantages and novel features of the present invention will be set forth in the description which follows, and will become apparent to those skilled in the art upon examination of the following more detailed description and drawings in which like elements of the invention are similarly numbered throughout.

DESCRIPTION OF THE INVENTION

Figure 1:
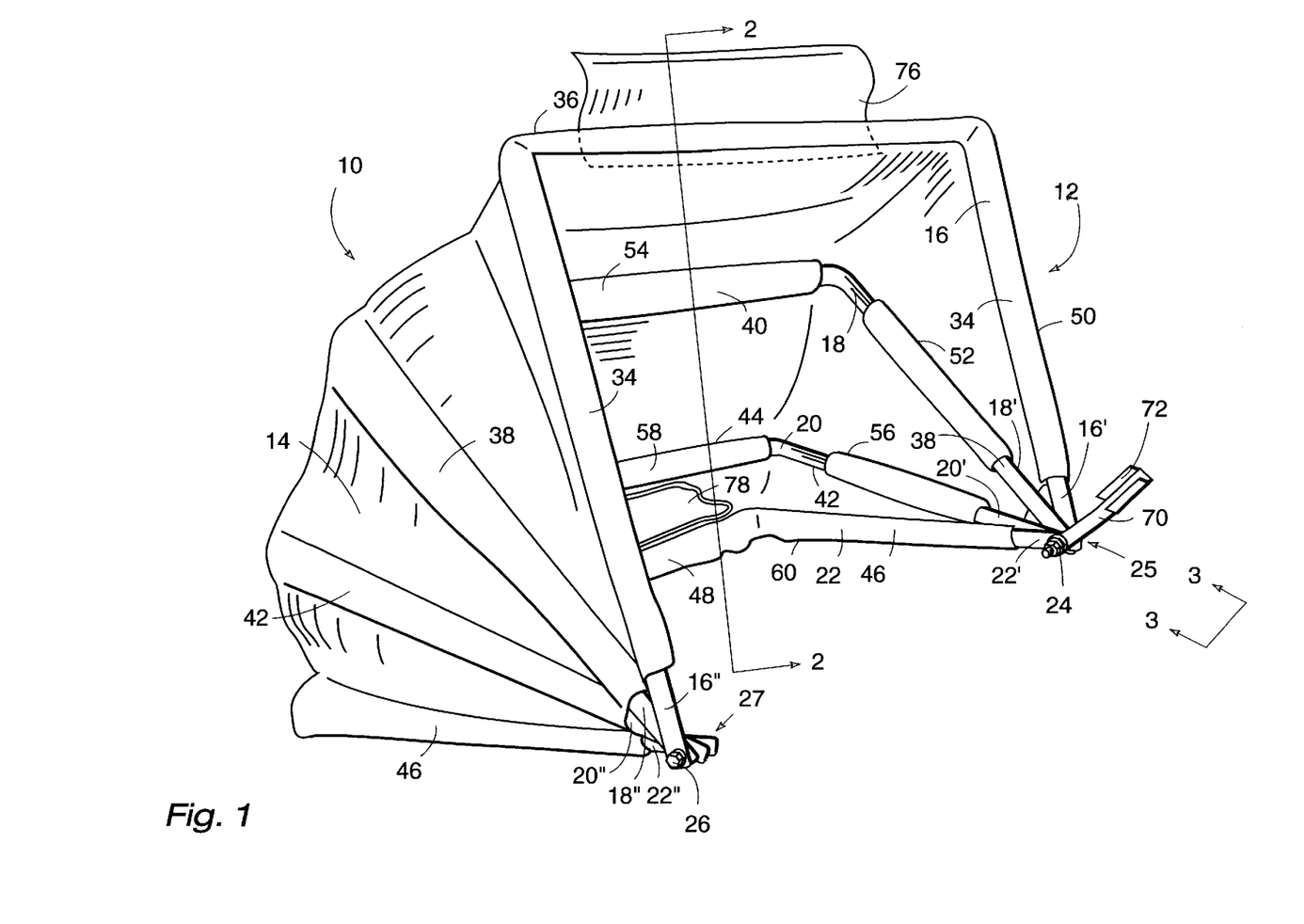
FIG. 1 is a perspective view of the awning in a partially open state.
Figure 3:
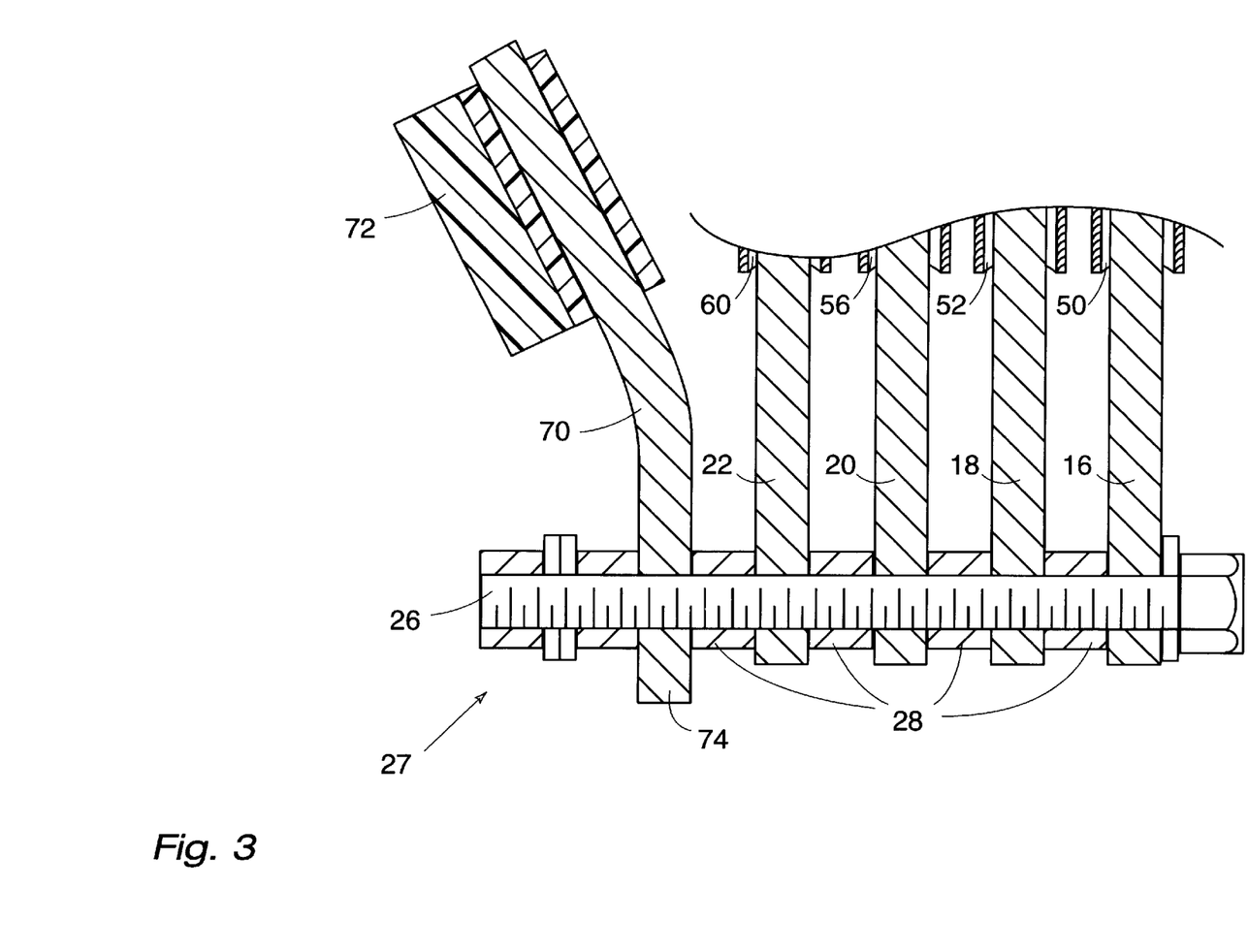
FIG. 3 is a cross-sectional view of a pivot point of the awning framework taken in side elevation along lines 3—3 in FIG. 1.

The awning attachment of the present invention, which is generally indicated by the reference numeral 10, is shown in FIG. 1. It is comprised of a framework 12 which supports a fabric covering 14. Framework 12 is comprised of a series of U-shaped rib members 16, 18, 20 and 22, each having ends 16', 16'', 18', 18'', 20', 20'', 22' and 22'', respectively. While additional, or fewer, rib members may be employed, four rib members provides the optimum number to adequately provide support for the fabric covering and give it a pleasing, gently arcuate shape. The respective rib member ends are connected together by bolts 24 and 26, as shown in FIGS. 1 and 3, to create common pivot points 25 and 27, respectively, by which the rib members may be moved relative to each other. Bushings 28 are provided along bolts 24 and 26 between the rib member ends to provide adequate separation thereof to facilitate relative movement of the rib members when fanned out. A sufficient amount of fabric covering 14 is provided to enable the awning, when deployed, to extend arcuately from the rear edge section 30 of the roof of the cart to a point slightly beyond the rear edge of the cart, and to a level approximately even with the seats of the cart, so as to effectively cover the top of a golf club bag 32 held upright in the storage compartment as shown in FIG. 4.

Figure 2:
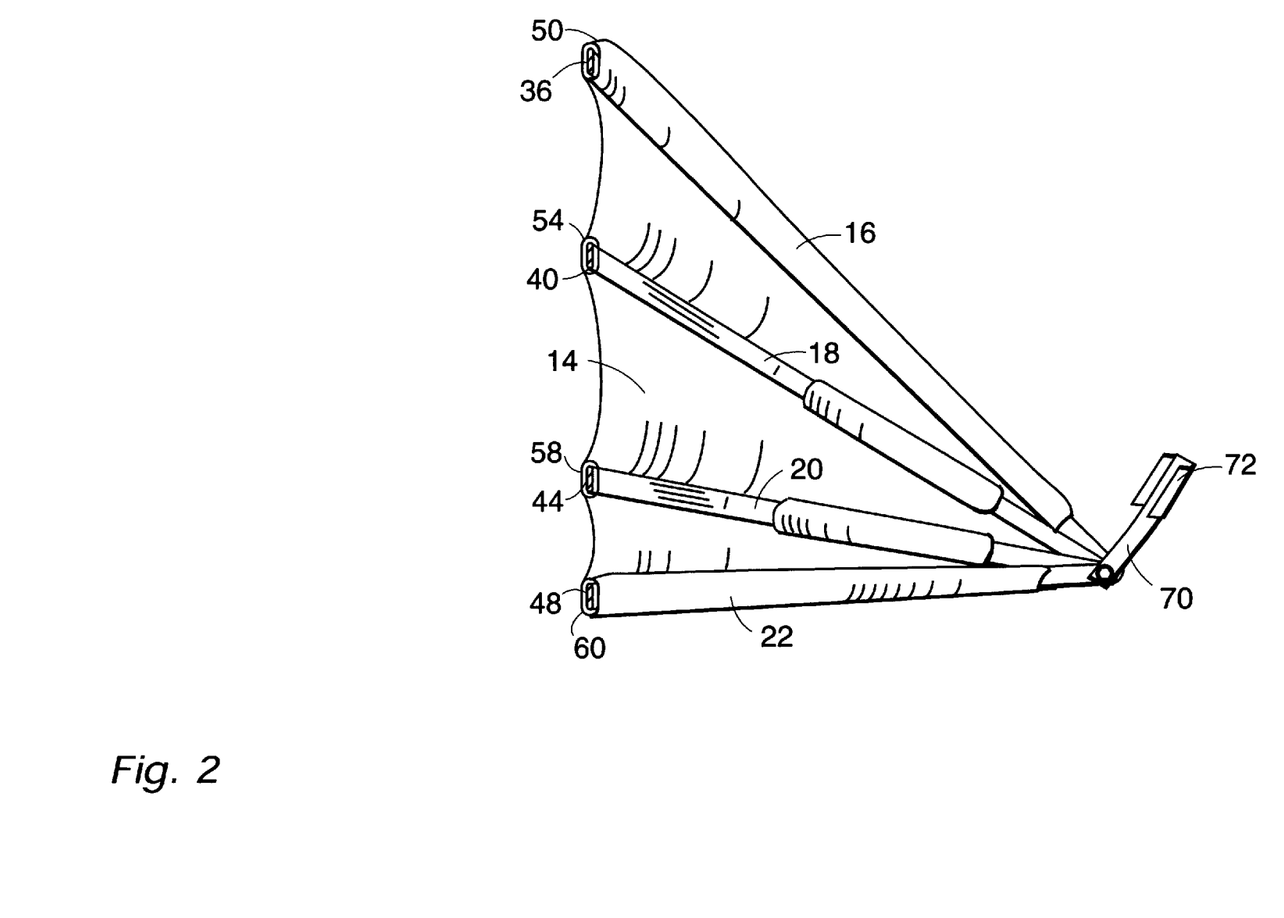
FIG. 2 is a cross-sectional view of the awning framework taken in side elevation along lines 2—2 in FIG. 1.

Sleeves are disposed on the forward and rear edges and underneath side of fabric cover 14 by sewing or the like to receive the rib members as shown in FIGS. 1 and 2. The sleeves allow a certain freedom of movement of the fabric cover along the rib members to facilitate deployment and retraction of the awning. Sleeve 50 is formed around the perimeter front lateral edge of fabric cover 14 and receives arms 34 and cross piece 36 of rib member 16. Sleeves 52 and 54 receive arm 38 and cross piece 40, respectively, of rib member 18. A corresponding sleeve 52 on the opposite interior side of fabric 14 receives the other arm 38. Similarly, sleeves 56 and 58 receive arms 42 and cross piece 44, respectively, of rib member 20. Sleeve 60 is formed around the perimeter rear lateral edge of fabric cover 14 and receives arms 46 and cross piece 48 of rib member 22.

Figure 6:
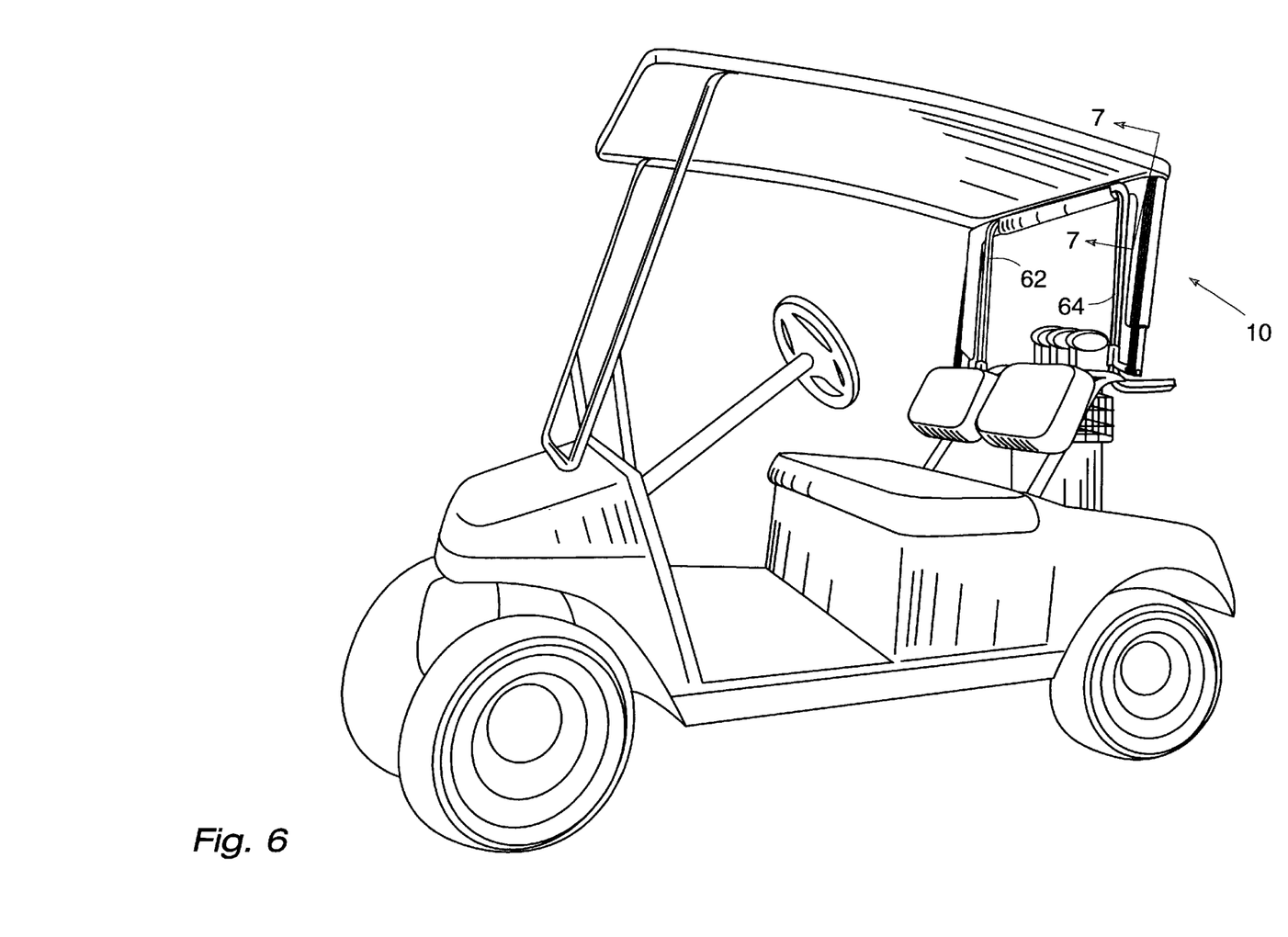
FIG. 6 is a perspective view of the awning in a retracted state on the back of a golf cart.

Each successive rib member after the first top rib member has an incrementally shorter dimension with respect to both its length and width so that the entire framework may lie substantially flat in a nesting relationship when in the closed retracted position shown in FIG. 6. As further shown in FIG. 1, rib member 16 comprises arms 34 and cross piece 36. Rib member 18 comprises arms 38, which are around ½ to one inch shorter than arms 34 of rib member 16, and cross piece 40, which is around one to two inches shorter than cross piece 36 of rib member 16. Likewise, rib member 20 comprises arms 42 and cross piece 44, which are respectively around ½ to one inch shorter than arms 38 and around one to two inches shorter than cross piece 40 of rib member 18. Further, rib member 22 comprises arms 46 and cross piece 48, which are respectively around ½ to one inch shorter than arms 42 and around one to two inches shorter than cross piece 44 of rib member 20. The dimensions may vary due to the thicknesses of the rib members and fabric cover 14 held between the rib members. This arrangement allows each successive rib member to be nested within the forwardly preceding rib member in a planar relationship. Rib members 16–22 are substantially flat in cross section which facilitates their side-by-side placement at pivot points 25 and 27 and also allows the nesting relationship shown in FIGS. 3 and 6. Bushings 28 keep the rib members spaced apart to provide room for the fabric sleeve material sandwiched between the rib members.

Figure 4:
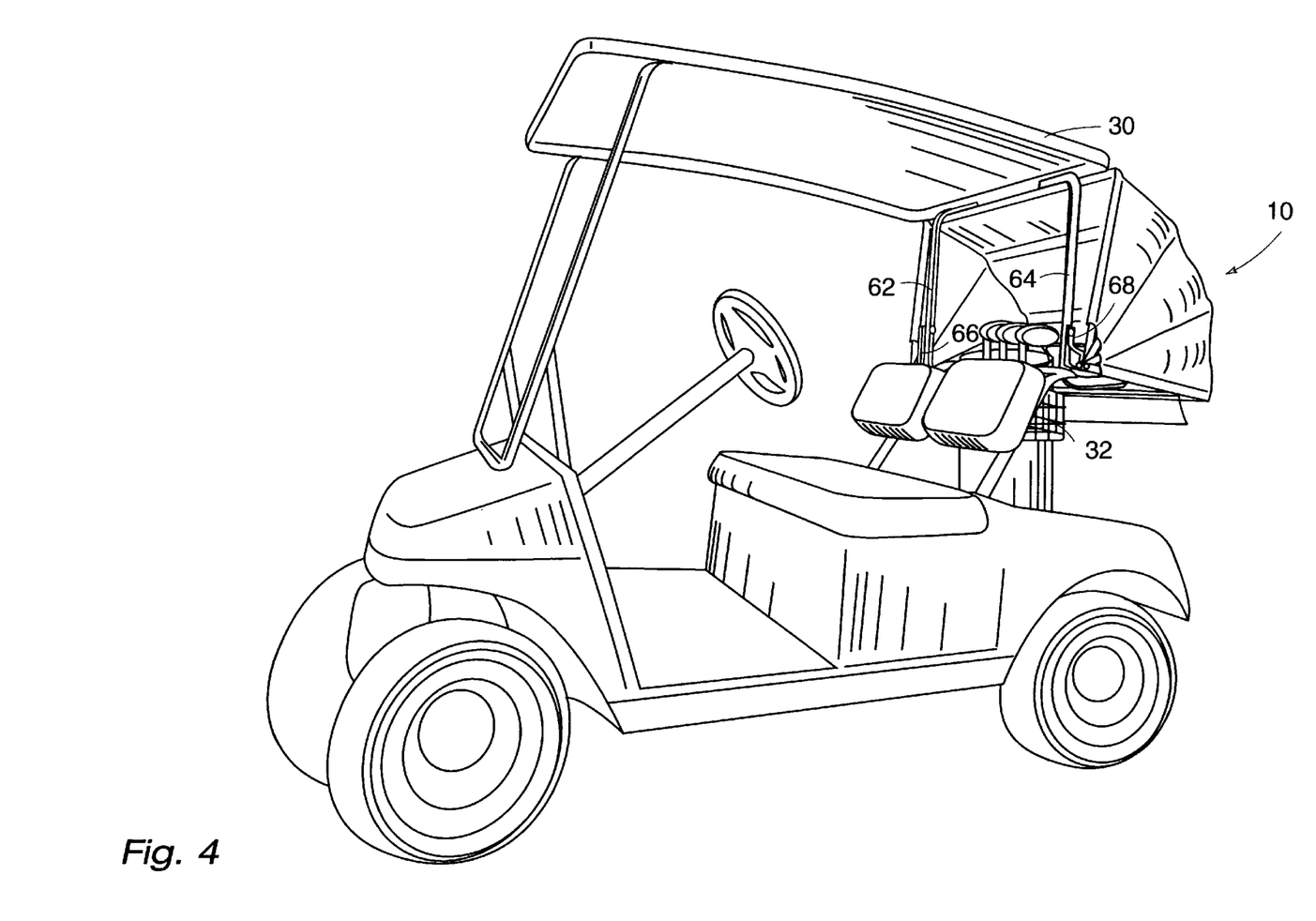
FIG. 4 is a perspective view of the awning in a deployed state on the back of a golf cart.
Figure 5:
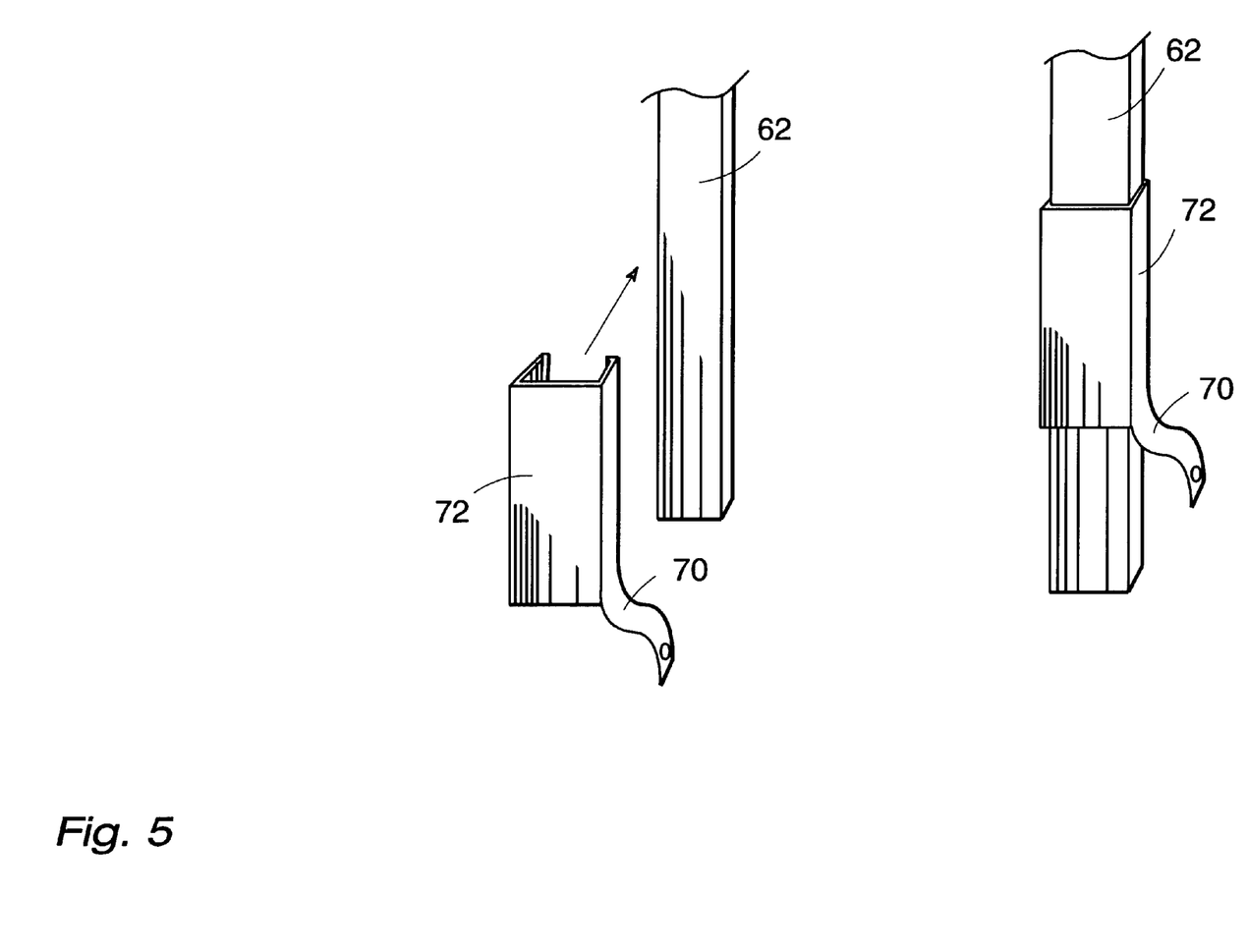
FIG. 5 is a view showing a mounting embodiment in which the bottom portion of the awning is attached to a support post of a golf cart.

The awning attachment is fitted on to a golf cart as shown in FIG. 4. The forward edge of the frame structure, at the top edge of rib member 16, is connected to the underneath side of the rear section 30 of the cart's roof. Such connection can be made by providing drill holes in both the rib member and the roof to allow screwing or bolting the rib member directly into the roof section, or by any other appropriate connection means known to those skilled in the art. Preferably, the rib member should lie flush with the rear edge of the roof so that the awning remains as unobtrusive as possible. The frame is further secured to the cart's upright, vertical support posts 62 and 64 through mounting clamps 66 and 68. These mounting clamps, as shown in FIG. 5, each comprise a metal strap 70 having a clamp 72 for engaging the cart's support post 62 or 64. Clamp 72 may comprise an open faced C-shaped channel having inwardly biased edges for holding support post in tight engagement. Alternately, a clamp having a tightening fastener, such as a threaded C-clamp, may be used. Mounting clamps 66 and 68 each have an end 74 for mounting at pivot points 25 and 27 for the rib members of framework 12 as shown in FIG. 3. It is to be understood that the configuration of the vertical support posts of carts of different manufacturers may vary, with the posts being set wide in some cart models and set narrow in other cart models. As such, the distance of the pivot points 25 and 27 to the cart's supports will vary. To accommodate such different dimensions, the mounting clamps may be provided with different lengths of straps 70.

Figure 7:
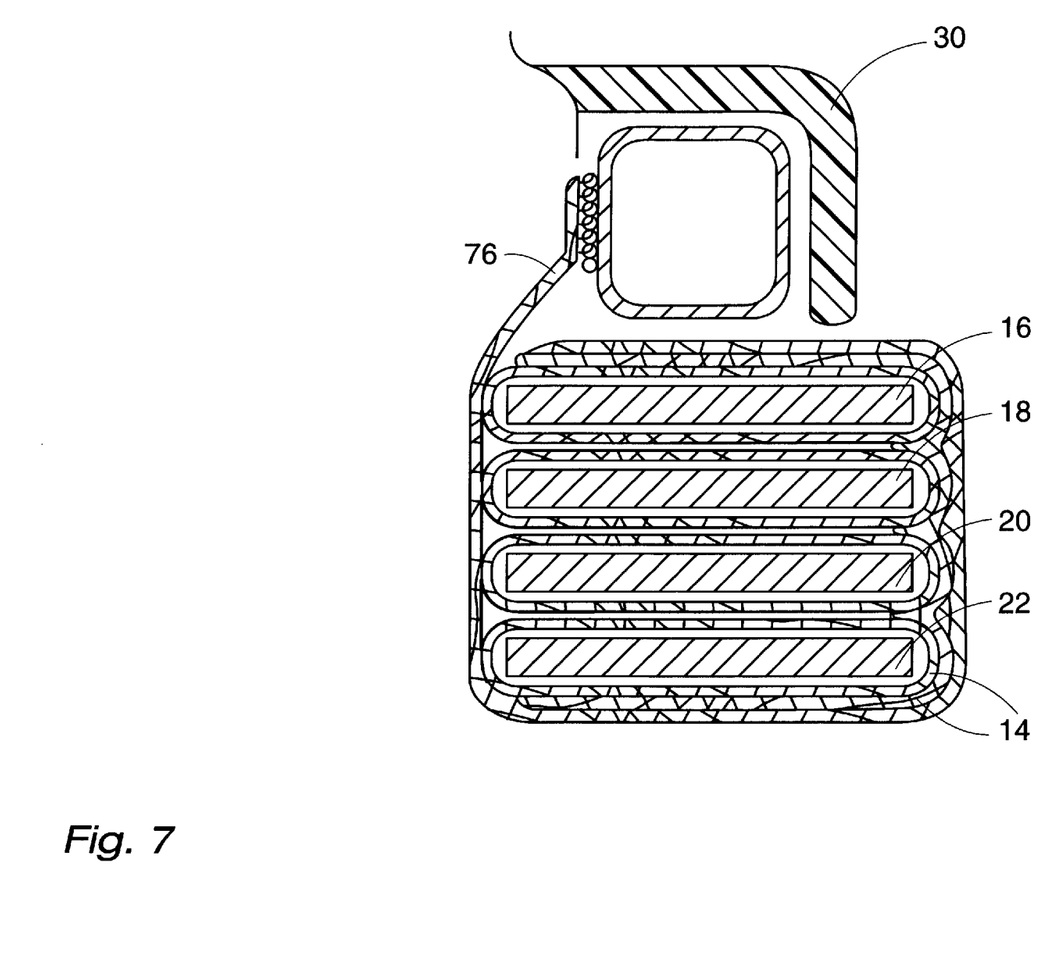
FIG. 7 is a cross-sectional view of the nested rib members comprising the awning framework taken in side elevation along lines 7—7 in FIG. 6.

To hold the loose fabric material of cover 14 in a neat bundle when the awning is in the closed, retracted position, a gathering flap 76 is provided on the top section of cover 14. FIG. 1 shows flap 76 extending along the substantial width of cross piece 36 of rib member 16, being secured to the fabric by sewing or the like along that end. The free end is provided with snaps or hook and loop fastening material. When the awning is in the open, deployed position, gathering flap 76 lies loosely on the top of fabric covering 14 on the back of the awning. It is not long enough, however, so that it dangles below the rear bottom edge of the awning. When the awning is folded up into its closed, retracted position, gathering flap is wrapped around the nested rib members and secured by its snaps or hook and loop fastening means to corresponding fastening means on the forward lateral edge of the framework of the awning or to the underneath side of the roof of the cart as shown in FIGS. 6 and 7. By having the gathering flap extend the substantial width of the framework, it avoids unsightly bulging out of material that would be present if narrow gathering strips were instead used. As an additional advantage, the wide gathering flap allows for printed material to be placed thereon which presents a useful marketing tool for advertisers during golf tournaments.

Use

The retractable awning of the present invention provides a useful attachment to the rear of a golf cart to keep equipment dry during rainy periods. It is very simply employed by pulling apart the rib members in fan-like fashion to create the arcuate structure of the awning. When a golfer needs to access her equipment and reach for a club, she need merely raise the edge of the awning to a sufficient degree to be able to reach in to the golf bag. When the rainy conditions no longer exist, the framework is simply pivoted into its closed retracted state. The nesting arrangement of the rib members allows for a neat, compact arrangement. Gathering flap 76 is then wound around the rear end of the rib members and brought around underneath the roof section to neatly bundle the fabric material. The awning of the instant invention, however, need not only be used for rainy conditions; it can also be used as a screen to protect the cart occupants from the rays of the sun. Thus, the awning can be kept in its open deployed state all the time. If desired, a window 78 may be formed in the rear of the awning using transparent plastic or the like.

Various changes and modifications may be made within this invention as will be apparent to those skilled in the art. Such changes and modifications are within the scope and teaching of this invention as defined in the claims appended hereto.

What is claimed is:

1. An awning attachment for a golf cart, said awning having means for attachment to a rear edge section of a roof member and support framework of said cart, said awning attachment comprising a framework comprised of a plurality of U-shaped rib members and a fabric cover, said U-shaped rib members engaging an underneath side of said fabric cover, each of said U-shaped rib members having opposing arms terminating in opposing ends, each of said opposing ends of said U-shaped rib members being respectively connected at common pivot points whereby said rib-members are adapted to be moved relative to each other such that said awning is adapted to be moved between an extended deployed position and a retracted closed position over a rear compartment of said cart.

2. The awning attachment for a golf cart of claim 1 in which a first U-shaped rib member of said awning is adapted to be positioned at said rear edge section of said roof member of said cart, each consecutive adjacent rib member having a dimension less than that of a preceding adjacent rib member, whereby each said rib member is adapted to nest within its preceding adjacent rib member so that said awning is capable of lying in a common plane when in said retracted closed position.

3. The awning attachment for a golf cart of claim 2 in which said awning is adapted to lie flush with said rear edge section of said roof member of said cart when in said closed position.

4. The awning attachment for a golf cart of claim 1 in which fabric sleeves are disposed on said underneath side of said fabric cover, each of said sleeves receiving one of said U-shaped rib members.

5. The awning attachment for a golf cart of claim 1 in which a gathering flap member is disposed on a top of said fabric cover toward a forward edge thereof, said flap member extending along a substantial width of said awning, said flap member having a free end with a length sufficient to wrap around said U-shaped members in a securing relationship when in said retracted closed position.

6. The awning attachment for a golf cart of claim 1 in which a first U-shaped rib member of said awning is adapted to be positioned at said rear edge section of said roof member of said cart, each consecutive adjacent rib member having a dimension less than that of a preceding adjacent rib member, whereby each said rib member is adapted to nest within its preceding adjacent rib member so that said awning is capable of lying in a common plane when in said retracted closed position, said awning being adapted to lie flush with said rear edge section of said roof member of said cart when in said retracted closed position, fabric sleeves being disposed on said underneath side of said fabric cover, each of said sleeves receiving one of said U-shaped rib members, a gathering flap member being disposed on a top of said fabric cover toward a forward edge thereof, said flap member extending along a substantial width of said awning, said flap member having a free end with a length sufficient to wrap around said U-shaped members in a securing relationship when in said retracted closed position.

7. An awning attachment for a golf cart, said awning being adapted for attachment to a rear of said cart, said awning attachment comprising a framework comprised of a plurality of U-shaped rib members and a fabric cover, said U-shaped rib members engaging an underneath side of said fabric cover, each of said U-shaped rib members having opposing arms terminating in opposing ends, each of said opposing ends of said U-shaped rib members being respectively connected at common pivot points whereby said rib members are adapted to be moved relative to each other such that said awning is adapted to be moved between an extended deployed position and a retracted closed position over a rear compartment of said cart, a first U-shaped rib member of said awning being adapted to be positioned at a rear edge section of a roof member of said cart, each consecutive adjacent rib member having a dimension less than that of a preceding adjacent rib member, whereby each said rib member is adapted to nest within its preceding adjacent rib member so that said awning is capable of lying in a common plane when in said retracted closed position.

8. The awning attachment for a golf cart of claim 7 in which said awning is adapted to lie flush with said rear edge section of said roof member of said cart when in said closed position.

9. The awning attachment for a golf cart of claim 7 in which fabric sleeves are disposed on said underneath side of said fabric cover, each of said sleeves receiving one of said U-shaped rib members.

10. The awning attachment for a golf cart of claim 7 in which a gathering flap member is disposed on a top of said fabric cover toward a forward edge thereof, said flap member extending along a substantial width of said awning, said flap member having a free end with a length sufficient to wrap around said U-shaped members in a securing relationship when in said retracted closed position.

11. The awning attachment for a golf cart of claim 7 in which a first U-shaped rib member of said awning is adapted to be positioned at a rear edge section of a roof member of said cart, each consecutive adjacent rib member having a dimension less than that of a preceding adjacent rib member, whereby each said rib member is adapted to nest within its preceding adjacent rib member so that said awning is capable of lying in a common plane when in said retracted closed position, said awning being adapted to lie flush with said rear edge section of said roof member of said cart when in said retracted closed position, fabric sleeves being disposed on said underneath side of said fabric cover, each of said sleeves receiving one of said U-shaped rib members, a gathering flap member being disposed on a top of said fabric cover toward a forward edge thereof, said flap member extending along a substantial width of said awning, said flap member having a free end with a length sufficient to wrap around said U-shaped members in a securing relationship when in said retracted closed position.

\* \* \* \* \*